United States Patent Office 3,464,052
Patented Aug. 26, 1969

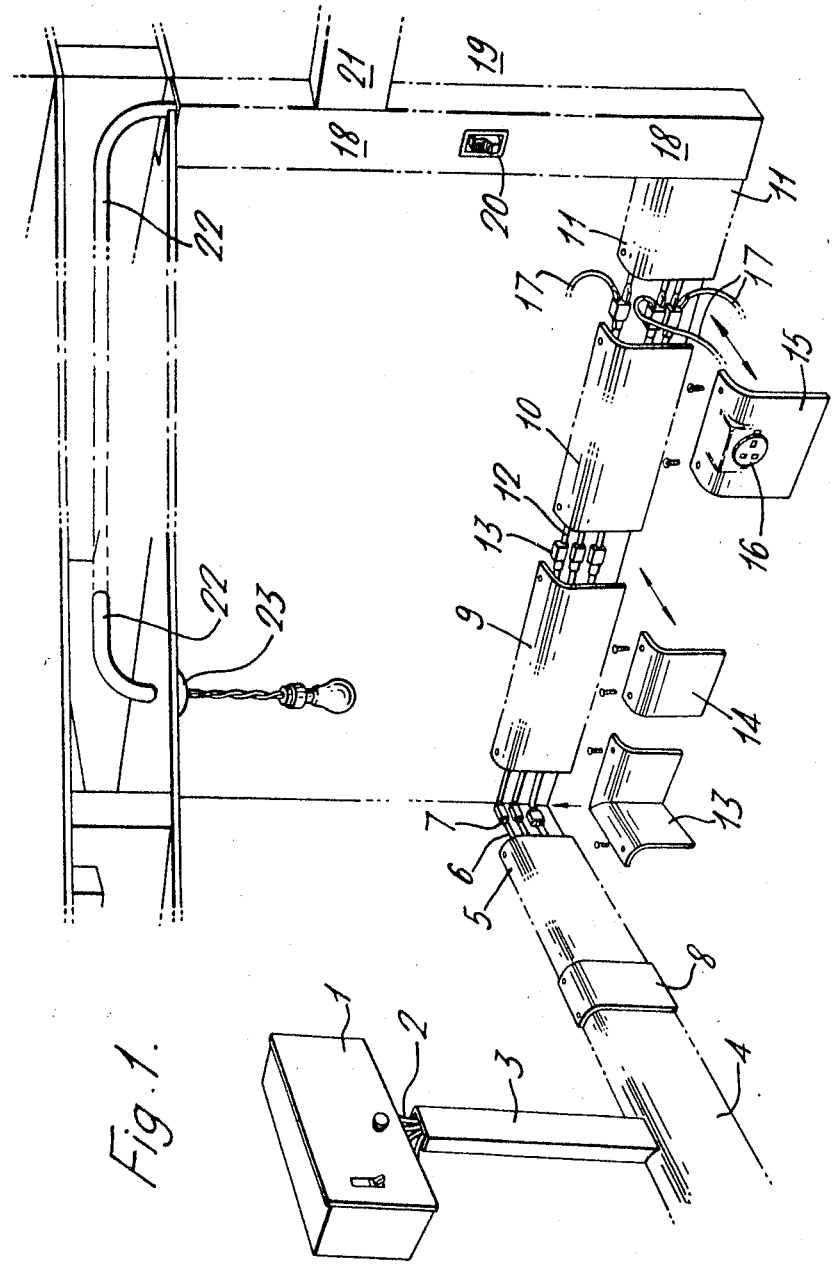

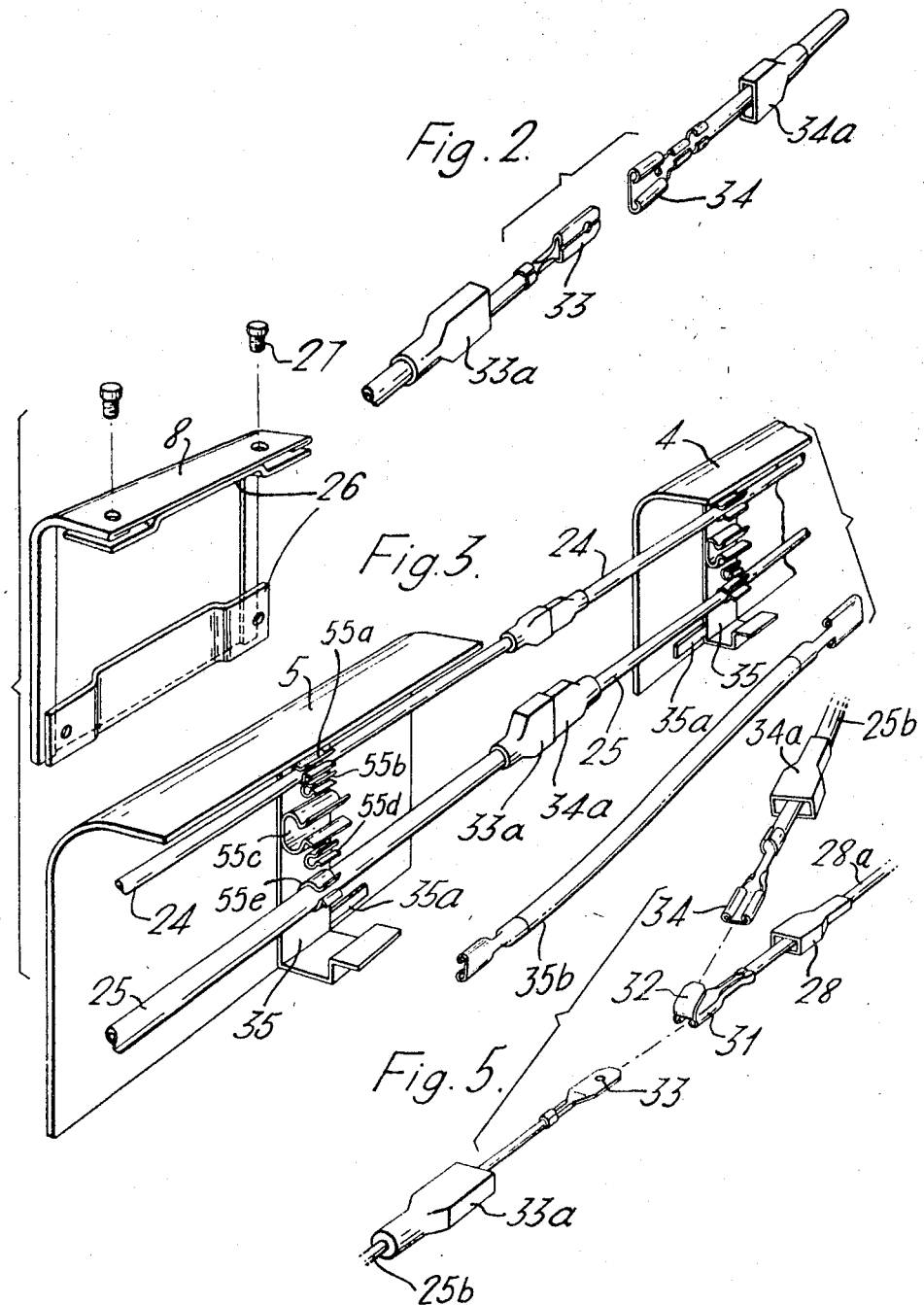

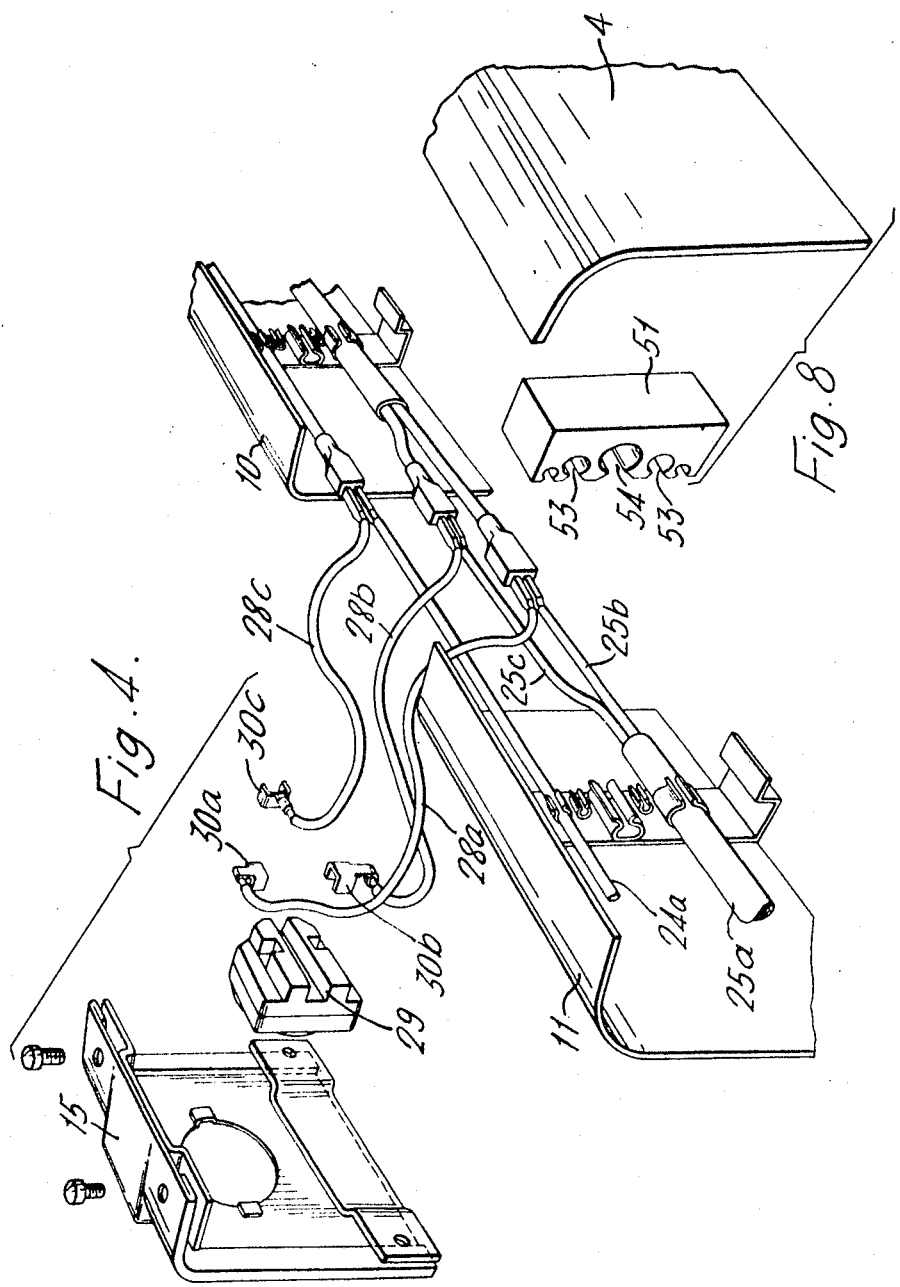

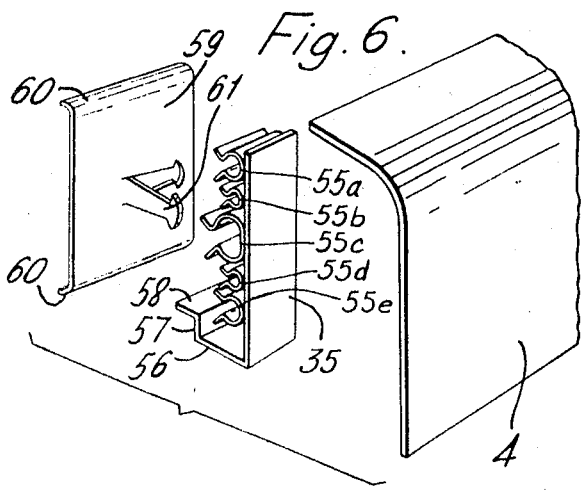
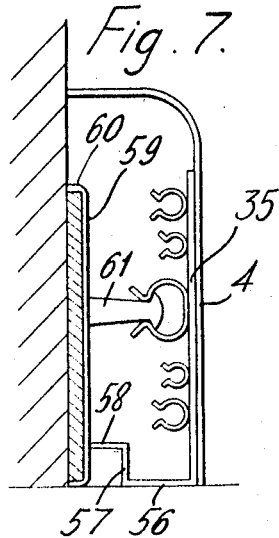
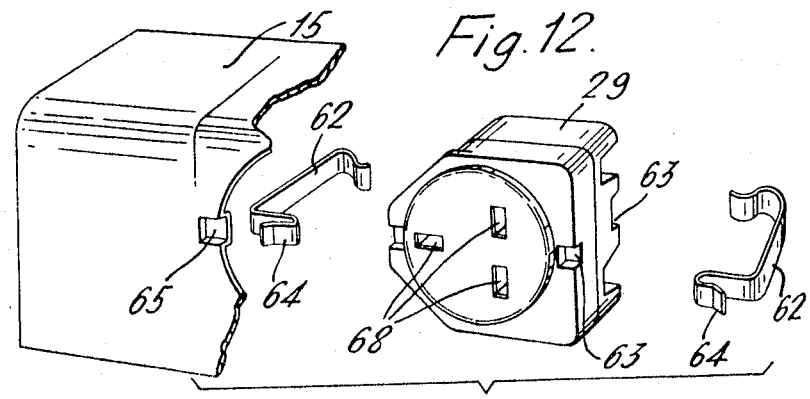
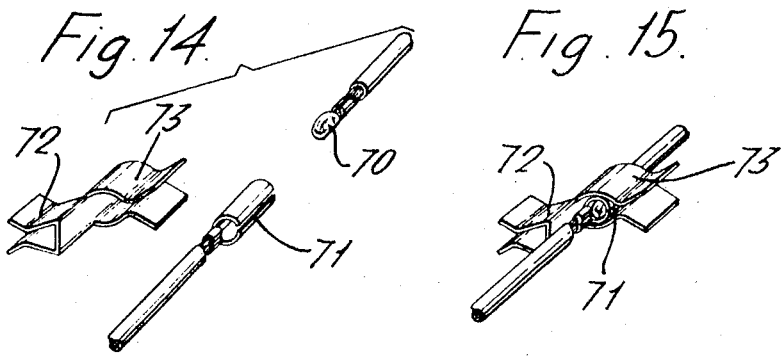

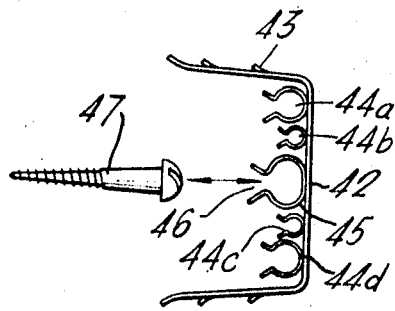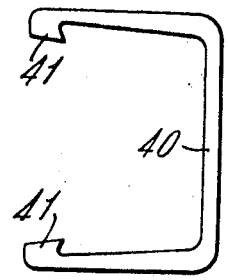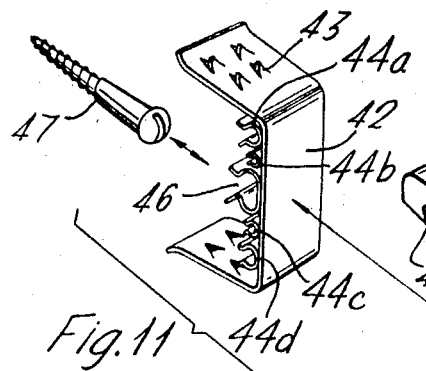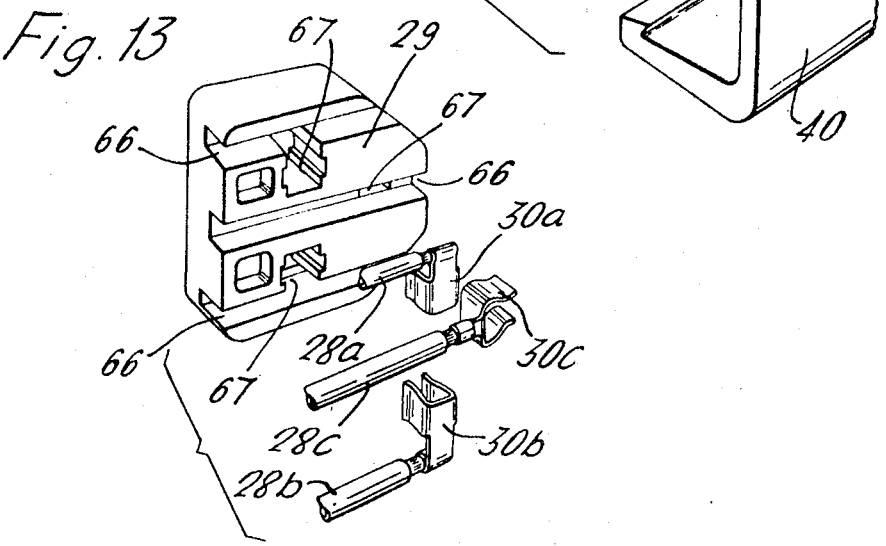

3,464,052
ELECTRICAL WIRING SYSTEMS
Arthur Shepherd Hukin, Cobham, England, assignor, by mesne assignments, to F. C. Blackwell and Company Limited, Liverpool, England
Filed Sept. 20, 1966, Ser. No. 580,764
Claims priority, application Great Britain, Oct. 1, 1965, 41,719/65
Int. Cl. H01r 13/60
U.S. Cl. 339—22
16 Claims

ABSTRACT OF THE DISCLOSURE

An electrical wiring system comprising a plurality of ducting sections arranged end-to-end in longitudinally spaced relationship with a gap between adjacent sections. Each section carries one or more electrically insulated flexible electric conductor leads secured by lead support means spaced along said section. The conductor leads are preterminated with complementary electrical connector means disposed in said gaps between adjacent sections. Each ducting section also comprises mounting means for releasably securing it to a headed stud fixed to a building wall. Ducting lapping sections are provided to bridge the gaps between adjacent ducting sections, and at least some of said lapping sections carry respective electrical service fittings, such as a socket outlet.

---

This invention relates to electrical wiring systems for buildings and is particularly concerned with systems which may be prefabricated in kit form for installation in domestic buildings.

Domestic buildings are customarily wired with an electrical wiring system fed from a main supply of the electricity authority which terminates in a metered power supply in the building. Conventionally the power supply is connected to a suitable fused distribution box from which wiring is laid to electrical service fittings located at various positions in the building. It is customary for the electrical service fitting, for example power outlets in the form of socket outlets, to be mounted at suitable positions within the building with ducting or channels leading to the outlets for access of wiring. The wiring is generally of flexible earthed twin core cable having an earth line and two insulated leads disposed within an insulating sheath and the cable is manually laid in the channels or ducting between the outlets. At each outlet the cable is cut and stripped and the stripped ends of the leads and the end of the earth line are connected into screw terminal connectors within the socket. In many instances disturbance of the building structure is required to accommodate the wiring or the outlets.

An electrical wiring system according to the present invention comprises a plurality of elongated ducting sections of preselected lengths each ducting section having mounting means for releasably securing the ducting section to a building wall, lead support means for releasably supporting a flexible insulated conductor lead extending longitudinally of the section. Each ducting section has at least one such conductor lead releasably supported in the lead support means and extending longitudinally of the section and at each end of the section into a gap between the adjacent sections. The lead is terminated at both ends by primary electrical connector means which are releasably interengageable with those of leads of adjacent sections. A plurality of ducting lapping sections are provided to bridge the gaps between the adjacent ducting sections and are releasably secured to the ends of the adjacent ducting sections. At least one of such lapping sections is provided with an electrical service fitting having secondary electrical connector means which are releasably connectable with the primary electrical connector means of said conductor leads of said adjacent ducting sections. Electrical insulator means are provided for insulating at least said primary electrical connector means whilst allowing said secondary electrical connector means to be connected to said primary electrical connector means.

In one embodiment the electrical surface fitting comprises a socket outlet having sockets crimped to flying leads terminated at ends with connectors having tab and tab-receptacle portions matable with a tab receptacle and tab, respectively, at the ends of ducting section leads. In another embodiment the socket contacts are formed with open-sided plug receptacle portions receiving the socket of a plug and socket splice between ducting section leads. In this embodiment the socket housing is suitably formed with slots into which the plug receptacle portions of the socket contacts project. The plug and socket splice connections between the ducting leads are thus disposed in the slots of the socket housing on assembly.

The invention will now be described by way of example with reference to the accompanying partly diagrammatic drawings, in which:

FIGURE 1 is a fragmentary perspective view of part of a room wired according to the system of the invention, FIGURE 2 is a fragmentary perspective view of one embodiment of the primary electrical connector means, FIGURE 3 is a fragmentary perspective, partly exploded, view of part of the system of FIGURE 1 showing the mounting means, lead support means, insulator means, and ducting lapping means in detail, FIGURE 4 is a view similar to that of FIGURE 3 showing a part of a wiring system embodying a socket outlet and employing an alternative arrangement of conductor leads, FIGURE 5 is an exploded view of part of the arrangement of FIGURE 4 showing the primary and secondary electrical connector means at the connection between a flying lead from the socket outlet and the main conductor leads, FIGURE 6 is a perspective view of the skirting section of FIGURE 3 showing the mounting means in more detail, FIGURE 7 is an end view of the parts of FIGURE 6 in assembled condition, FIGURE 8 is a perspective view of a skirting section and alternative mounting means therefor in exploded relation, FIGURE 9 is a side view of a mounting clip forming part of an alternative mounting means, FIGURE 10 is an end view of one form of ducting section with which the mounting means of FIGURE 9 is used, FIGURE 11 is a perspective exploded view of the parts shown in FIGURES 9 and 10, FIGURE 12 is a fragmentary view of a socket outlet in relation to a ducting lapping section, FIGURE 13 is a rear view of the socket outlet of FIGURE 12 with associated electrical connector means and flying leads, FIGURE 14 is an exploded view of an alternative embodiment of socket contact and primary connector means for the conductor leads, and FIGURE 15 is a view of the parts of FIGURE 14 in assembled condition.

FIGURE 1 is a fragmented view of part of a wiring system installed in a part of a building. A mains distribution box 1 is mounted on a wall and connected in suitable manner to the mains electrical supply. Electrically insulated flexible electric conductor leads 2 from the box 1 extend into and along a wall-mounted channel section duct 3. The leads 2 are terminated with tabs at one end and tab receptacles at the other end, for example as shown in FIGURE 2, and are of lengths slightly greater than that of the duct 3. The leads 2 are releasably supported by lead support means fixedly secured to the duct 3 and the latter is releasably secured to the wall of the building by mounting means, as will be described below. The box 1 is suitably provided with tab terminals at its outlet side for connecting with the receptacles of the leads 2.

The duct 3 comprises one section of a ducting system and at its lower end enters an aperture in the upper edge of a ducting section formed as a skirting section 4 secured to the wall by mounting means comprising clips at spaced locations as will be described. At their lower ends the leads 2 are connected, by way of the tabs, to tab receptacles of leads mounted in the section 4. The section 4 has one set of leads extending from adjacent the duct 3 to one end of the section 4 and another set extending from adjacent the duct 3 to the other end of section 4, which suitably comprise the beginning and the end of a ring circuit. Connection between leads 2 and leads within section 4 may, for example, be as disclosed in FIGURE 2 or in FIGURE 5.

The ducting system is extended by an adjacent section 5 to the corner of the room. The section 5 is similar to the section 4 and contains leads 6 terminated at their opposite ends by respective parts of primary electrical connector means 7 for releasably establishing electrical connection between the leads of the adjacent sections. At the end of the section 5, which is adjacent to, but spaced longitudinally from, the section 4, the leads 6 are connected by such primary connector means to respective leads of section 4 as shown, for example, in FIGURE 2. The gap between the adjacent ends of the sections 4 and 5 provides access to the lead interconnections and the space is covered by ducting lapping means comprising a removable cover plate 8 overlapping the ends of the sections 4 and 5.

The ducting system is extended past the room corner by further similar skirting sections 9, 10, 11 arranged end to end in spaced apart manner and each releasably secured to the room wall by mounting means described hereinafter. Each of the sections 9, 10, 11 is provided with insulated flexible conductor leads 12 of length slightly longer than the length of the corresponding sections 9, 10, 11. These leads 12 are preterminated by respective parts of primary electrical connector means 13 and the leads of adjacent sections are interconnected by said primary connector means 13 in the spaces between the sections.

At the corner of the room the space between sections 5 and 9 is closed by ducting lapping means comprising a cover plate 14 of corner section releasably secured to the sections 5 and 9. The space between sections 9 and 10 is closed by ducting lapping means comprising a removable cover plate 15 similar to the plate 8.

The space between sections 10 and 11 is closed by ducting lapping means comprising a cover plate 15 releasably secured to the ends of the adjacent sections in overlapping manner. The cover plate 15 is provided with an electrical service fitting comprising a socket outlet 16 mounted at an aperture in the plate 15. The socket contacts of the socket outlet 16 are connected to flying leads 17 formed at their ends with connectors which constitute secondary electrical connector means and have both tab and tab receptacle portions for engaging respective receptacles and tabs of leads of sections 10 and 11 in the manner shown in FIGURE 5.

The skirting section 11 at its free end engages in an aperture in the lower end of a channel section duct 18 disposed in upright manner as an architrave adjacent a door opening 19 in the building wall. The duct 18 is releasably secured to the wall mounting means as hereinafter described and is provided intermediate its ends with a fused switch 20. Above the switch 20 the duct 18 is formed at one side with an aperture receiving an end of a further channel section duct 21, forming a lateral extension of the ducting for carrying the wiring circuit above the door opening 19, and the duct 21 suitably continues in further channel section ducts and/or skirting sections around the ring main.

The channel section duct 18 carries leads supported by lead support means as hereinafter described, the leads being terminated by primary electrical connector means at their lower ends for connection to the leads of the preceding skirting section 11 and at their upper ends adjacent the duct 21 for connection to the leads associated with duct 21. Adjacent to the fused switch 20, the leads of the duct 18 are broken and interconnected in the manner shown in FIGURE 5 with each other and a flying lead to the fused switch and the lighting circuit. The flying leads of the lighting circuit are supported by lead support means within the duct 18 above the switch 20 and a flexible plastic tube 22 is threaded through apertures in the ceiling structure to a light rose 23 and extends from the upper end of duct 18. The plastic tube 22 contains upper portions of the flying leads which extend internally of the tube and are terminated at their ends remote from the fused switch 20 with connectors for releasable engagement with terminals of the ceiling rose 23. Alternatively to the tube 22, a further channel section duct (not shown) may be mounted across the ceiling leading directly to the ceiling rose 23 and containing the lighting wiring. Having thus summarized the general features of the system, the various components will now be described in more detail with reference to the remaining figures.

FIGURE 2 shows one form of primary electrical connector means comprising a mating tab 33 and receptacle 34 terminating respective conductor leads. Each lead carries insulating means for the primary connector means comprising a plastic insulating boot 33a, 34a slidable on the lead, the plastic boots 33a and 34a being matable in overlapping manner as seen in FIGURE 3 when the tab 33 and receptacle 34 are engaged.

In FIGURE 3 a pair of adjacent skirting sections such as 4 and 5 of FIGURE 1 are shown from within. Each skirting section carries internally adjacent its end a multiple clip member 36 rigidly secured to the skirting section as described below in connection with FIGURES 6 and 7. Each clip 36 serves as both the mounting means and the lead support means and is formed with a series of clips 55a, 55b, 55c, 55d and 55e for receiving the insulated conductor leads 24 and 25 and the head of a headed member secured to the wall. The clips 55a, 55b, 55d and 55e are suitably designed to accept leads of different cross-sectional dimensions whilst the clip 55c is designed to cooperate with said head thereby to secure the section to the wall. The upper conductor lead 24 is thus of smaller cross-sectional dimensions than the lead 25. Where the skirting sections 4, 5 are of metal the clips 35 are suitably formed with tabs 35a which may be releasably interconnected by a short lead 35b having tab receptacles at its ends. In this way an earth continuity circuit may be assured.

The skirting sections are provided with such multiple clip members 35 at spaced intervals along their lengths to support the wire leads such as 24, 25, which at ends of the skirting sections are terminated by tabs such as 33 or receptacles such as 34 for mating engagement and respective insulating boots 33a, 34a are telescopically engaged about the engaged connectors to provide an insulating shroud.

The lapping plate 8 is arranged to cover the space between the adjacent spaced ends of skirting sections 4, 5 and has a similar profile. Internally of its upper and lower edges, the lapping plate 8 is formed with metal strap members 26 each having its ends spaced from the inner side of the plate 8 to define a slot for receiving an edge of the section 4 or 5. Variation in the spacing between adjacent ends of sections 4 or 5 may be accommodated within limits by virtue of the slots. Clamping screws 27 accessible externally of the plate 8 are arranged to engage threaded apertures in the straps 26 to clamp ends of sections 4 and 5 between the straps 26 and the plate 8.

In FIGURE 4 the adjacent end portions of the skirting sections 10 and 11 are seen from within and an alternative conductor arrangement to that of FIGURE 3 is shown. A twin core mains lead 25a is mounted in each skirting section and the respective insulated cores are interconnected at the space between the sections with those of the adjacent section and with respective flying leads 28a and 28b as shown in FIGURE 5, and a third flying lead 28c extends in similar manner from the interconnection of earth leads 24a.

In FIGURE 5 the flying lead 28a is shown terminated by secondary electrical connector means comprising a connector having a tab receptacle portion 31 and an integral tab portion 32 bent back from its forward end. The cores 25b and 25c of the main lead each have a tab 33 at one end and a tab receptacle 34 at the other end which, in the absence of the socket outlet 16 would be connected directly together as the primary electrical connector means previously described. However, at the interconnection between the cores of the main leads arranged to embrace both the boot 34a around the receptacle 34 and a boot 28 around the receptacle 34. The boot 33a around tab 33 is arranged to embrace boots 34a and 28 around receptacle 34 and receptacle portion 31.

The flying leads 28a, 28b and 28c, as shown in FIGURE 4, are terminated at their ends remote from the main leads by receptacles 30a, 30b and 30c releasably mountable, as described below in connection with FIGURE 13, in respective passageways of a socket moulding 29 of the socket outlet 16 arranged to receive plug pins through its forward face for engaging the respective receptacles 30a, 30b and 30c. The moulding 29 is mounted, as described below in connection with FIGURE 12, in an aperture of the lapping plate 15, which is otherwise similar to the lapping plate 8 described in connection with FIGURE 3.

FIGURES 6 and 7 show one manner in which the skirting sections, for example, section 4, can be releasably mounted on the wall. The multiple clip member 35 is of metal and of generally L-shape. The foot 56 of the clip member 35 is turned up at 57 and then away from the skirting section 4 at 58 to define a stand-off projection for spacing the skirting section 4 at its base an appropriate distance from the wall. The turned-up portion 57 defines with the foot 56 an upright part of the member 35 a channel for supporting service wiring such as telephone and television cables below the clips 55a, 55b, 55c, 55d and 55e on the upright part of the member 35 generally in the manner of clip 42 of the FIGURE 6 embodiment.

For securing the skirting section 4 to a wall, mounting plates 59 are provided at intervals corresponding to the spacing of multiple clip member 35 along the section. Each mounting plate has its upper and lower edges rolled back to stand plate 59 from the wall by a distance corresponding to the desired thickness of an adhesive bonding layer. At a height above the lower edge corresponding to the height of the central clip 55c of the member 35, each mounting plate 59 is formed with a headed tongue 61 pressed out from the plate. The head of the tongue serves to engage the central or mounting clip 55c of the member 35 in the same general manner as shown in FIGURE 7.

The members 35 are preferably secured to the skirting section 4 by welding if the latter is made of metal.

The alternative manner of mounting the sections is shown in FIGURE 8. In this case the section 4 is made of metal and comprises an inverted L-shaped section appropriately radiused at the apex of the L. Preferably the metal section is coated on its outer surface with a plastic film for decorative and insulating purposes. In this case the combined mounting and lead support means comprises a multiple clip member 51 formed as a short length of a resilient plastic extrusion of generally rectangular form having on one face a series of clip-like slots 53 for receiving leads of the skirting section and a central slot 54 for engaging the head of a stud for releasably securing the skirting to a wall generally as described with reference to FIGURES 6 and 7 or FIGURES 9 to 11. The members 51 are adhesively bonded to the inner surface of the skirting section 4 at appropriately spaced intervals for supporting the leads of the skirting section and supporting the section against a wall.

FIGURES 9 to 11 show an embodiment of channel section duct which may be used, for example, at the architrave section 18 or ceiling section previously mentioned or riser section 3 of the FIGURE 1 arrangement. A channel section duct 40 has inturned edges 41. A multiple clip member 42 for mounting in the duct is of complementary form having barbs 43 in its side legs for gripping sides of the duct 40. Internally of its web, the member 42 is formed with a series of lead supporting clips 44a, 44b, 44c, 44d of various sizes for resiliently gripping leads of differing sectional dimensions. A central mounting clip 45 of still larger size has a flared lead-in portion 46 and is arranged to engage the head of a screw or stud 47 secured in a building wall surface. In operation a length of duct 40 is provided internally at intervals with multiple clip members 42 and predetermined leads of length slightly greater than that of the duct 40 are secured in appropriate clips 44a, 44b, 44c, 44d. The assembly is then transported to site where screws or studs 47 are secured in a wall at spacings corresponding to the spacings of the members 42 within the duct 40 with their heads disposed a predetermined distance from the wall surface. The channel 40 is then secured to the wall by snapping the mounting clips 45 over the heads of the studs 47 and the flared lead in portions 46 is adapted to facilitate this. By suitably forming mounting clip 45 a low push-on force but high pull-off force is obtained and suitably the design gives a pull-off force greater than will be expected under normal conditions so that the channel can only be removed from the wall by appropriate tooling.

After mounting the channel section duct 40 on a wall, the leads of the channel are connected with respective leads of an adjacent channel or skirting section by the primary electrical connector means previously described.

The channel section duct and multiple clip member of FIGURE 6 are particularly suitable where the duct 40 is made of extruded plastic material.

The socket moulding 29 of FIGURE 4 is suitably mounted in the lapping plate 15 by clips 62 as shown in FIGURE 12. The clips 62 are of generally U-shaped and are arranged to grip the socket 29 between front and rear surfaces of the latter at slots 63. Forward limbs of the clips 62 are turned back at 64 in hairpin manner to grip edge portions 65 of the lapping plate 15 at opposite sides of the aperture. Recesses are provided at portions 65 to contain the clip portions 64.

Alternatively, the clips 62 at their forward limbs may be welded to the skirting on its inner side.

As shown in FIGURE 13, the socket moulding 29 is formed on its rear face with three parallel slots 66 for containing respective flying leads 28a, 28b and 28c of the FIGURE 4 arrangement. Contact receiving cavities 67 communicate with respective slots 66 and at a forward face of the moulding open at plug-pin receiving apertures 68 (FIGURE 12). Connector receptacles 30a, 30b and 30c are crimped to the ends of the leads 28 in appropriate flag fashion so that the receptacles 30 project into the cavities 67 and register with the apertures 68 when leads 28 are disposed in the slots 66. The cavities 67 are suitably shouldered so that the receptacles 30 latch into the cavities.

In FIGURES 14 and 15 is shown an alternative embodiment of socket contact and main lead interconnection to that of FIGURES 4, 5 and 13. In place of the tab 33 and receptable 34 connectors of FIGURE 5 the main leads are terminated by mating plug and socket connectors 70 and 71 which then form the primary electrical connector means. The socket 71 comprises a cylindrical sleeve containing the plug 70 on mating engagement. A socket contact 72 of the socket outlet is formed with a rearwardly projecting receptacle portion 73 arranged resiliently to receive the socket cylinder 71 and thereby serve as the secondary electrical connector means previously referred to.

As shown in FIGURE 15, the interconnection between the main leads at the plug 70 and socket 71 may be directly connected to the rear of the socket contact 72. Suitably the cavities 67 of the socket moulding 29, the slots 66 and the contact parts 72, 73 are so arranged that the plug and socket interconnection and the main leads are disposed longitudinally of the slots 66 when engaging receptacle portion 73 and with socket contact 72 in appropriate position. If desired the rear of the socket may be covered by an insulating plate, the boot means which would normally be provided to insulate the plug 71 and the socket 70 being removed to allow electrical connection to be made to the receptacle portions 73.

The invention facilitates the electrical wiring of buildings and is particularly useful in prefabricated or factory produced building structures designed to minimise site erection time. Such buildings cannot economically be made available at intermediate stages in the erection program for electrical wiring to be installed by conventional techniques and it is uneconomic and undesirable for the completed fabric of the building structure to be altered after completion to accommodate conventional wiring. The parts of the present invention are adapted for assembly and fitting into a complete building structure without structural alteration. Furthermore, assembly of the parts of the invention into a wiring system can largely be effected without skilled electricians who are only required for inspection of the appropriate connections and circuit testing.

It is contemplated that the different parts of the present invention will be dimensioned preselected in accordance with modular dimensions of a building system and packaged in kits of complete parts for wiring an individual building or room. Such kits of parts may be supplied to a building site for immediate installation in erected buildings and all electrical connections on site are made by matable connectors, all of the wire lead termination being effected prior to supply to the site. The parts of the invention may be adapted to different architectural requirements and to obtain different aesthetic effects without variation of the functional advantages.

I claim:
1. An electrical wiring system comprising:
  (a) a plurality of ducting sections of preselected lengths,
  (b) mounting means releasably securing said ducting sections to a building wall in longitudinally spaced relation whereby a gap exists between adjacent ones of said sections, said gap having a length much less than that of said sections,
  (c) lead support means for releasably supporting in respective ones of said ducting sections at least one longitudinally extending conductor lead,
  (d) a plurality of electrically insulated flexible electric conductor leads extending at each end into said gap between said adjacent ducting section and each being terminated by primary electrical connector means for releasably establishing electrical connection between those conductor leads in said adjacent ducting sections,
  (e) a plurality of ducting lapping sections respectively bridging said gaps between said adjacent ducting sections and releasably secured to the ends of said adjacent ducting sections,
  (f) at least one electrical service fitting carried by a respective one of said ducting lapping sections having secondary electrical connector means for establishing electrical connection between said service fitting and said primary connector means, and
  (g) electric insulator means for electrically insulating at least said primary connector means whilst allowing said secondary connector means to be connected to said primary connector means.

2. An electrical wiring system as claimed in claim 1 wherein said primary connector means of said conductor leads of said adjacent ducting sections are connected directly together and said secondary connector means are connected directly to said connected primary connector means.

3. An electrical wiring system as claimed in claim 1 wherein said primary connector means comprise mating plug and socket connectors.

4. An electrical wiring system as claimed in claim 1 wherein said service fitting has electrically insulated flexible flying conductor leads extending therefrom and said flying leads terminate in said secondary connector means.

5. An electrical wiring system as claimed in claim 1 wherein said secondary electrical connector means are rigidly secured to said service fitting.

6. An electrical wiring system as claimed in claim 1 wherein said service fitting has a body formed with open-ended slots and said secondary connector means are disposed in respective ones of said slots, said conductor leads and said primary connector means also being received within said slots.

7. An electrical wiring system as claimed in claim 1 wherein said service fitting comprises a socket outlet having socket contacts formed with receptacle portions for receiving said primary connector means.

8. An electrical wiring system as claimed in claim 1 wherein said mounting means and said lead support means comprise respective portions of a multiple clip member, and a wall mountable headed stud having a head dimensioned to be a snap fit within one of said portions of said multiple clip member.

9. An electrical wiring system as claimed in claim 8 wherein said headed stud comprises a pressed out headed tongue formed in a plate adhesively bonded to said wall and having turned over edges which stand said plate off from the wall to define a cavity receiving an adhesive bonding layer.

10. An electrical wiring system as claimed in claim 8 wherein said multiple clip member comprises a plastic block member secured to said ducting section and having a face presented inwardly of said ducting section which is formed with a series of slots extending lengthwise of said ducting section, one of said slots serving as said mounting means, and the other slots being adapted to receive and hold said conductor leads.

11. An electrical wiring system as claimed in claim 8 wherein said multiple clip member comprises a metal member having a series of spring clips defining slots extending lengthwise of said ducting section.

12. An electrical wiring system as claimed in claim 11 wherein said ducting section is of channel shape in transverse section and said clip member is a snap fit within said ducting section.

13. An electrical wiring system as claimed in claim 11 wherein said multiple clip member is welded to said ducting section.

14. An electrical wiring system as claimed in claim 13 wherein said multiple clip member is formed with a metal tab mating with a tab receptacle of a flying lead extending between the multiple clip mmebers of two adjacent ducting sections.

15. An electrical wiring system as claimed in claim 13 wherein the multiple clip member is of inverted L-shape having a foot with an upturned end defining a stand-off projection for spacing the ducting section from the wall.

16. An electrical wiring system comprising:
(a) a plurality of ducting sections of preselected lengths,
(b) mounting means for releasably securing each of said ducting sections to a building wall,
(c) lead support means for releasably supporting in respective ones of said ducting sections at least one longitudinally extending conductor lead,
(d) a plurality of electrically insulated flexible electric conductor leads each having a length slightly greater than that of said ducting sections, and each being terminated at both ends by primary electrical connector means for releasably establishing electrical connection between such connector leads when supported in adjacent ones of said ducting sections,
(e) ducting lapping means for bridging a gap between longitudinally adjacent ducting sections when the latter are installed on said building wall spaced apart longitudinally so that said gap exists between said adjacent ducting sections,
(f) at least one electrical service fitting carried by a respective one of said ducting lapping means and having secondary electrical connector means for establishing electrical contact between said service fitting and said primary connector means when the latter are disposed in said gap, and
(g) electrical insulator means for electrically insulating at least said primary connector means whilst allowing said secondary connector means to be arranged in electrical contact with said primary connector means, said insulator means being structurally separate from said conductor leads.

References Cited

UNITED STATES PATENTS

| 1,096,699 | 5/1914 | Elkin. | |
| 1,984,356 | 12/1934 | Abbott | 339—22 XR |
| 2,001,222 | 5/1935 | Stensgaard | 52—287 |
| 2,132,400 | 10/1938 | Curren | 339—23 XR |
| 2,161,606 | 6/1939 | Andre | 339—59 |
| 2,312,580 | 3/1943 | O'Brien | 339—22 XR |
| 2,574,075 | 11/1951 | Weisler | 339—23 |
| 3,171,702 | 3/1965 | Schumacher et al. | 339—22 |
| 3,240,456 | 3/1966 | Hartmann | 174—48 XR |

FOREIGN PATENTS

| 569,697 | 6/1945 | Great Britain. |
| 577,049 | 5/1946 | Great Britain. |
| 365,522 | 12/1962 | Switzerland. |

MARVIN A. CHAMPION, Primary Examiner

P. A. CLIFFORD, Assistant Examiner

U.S. Cl. X.R.

339—123